United States Patent
Digeser et al.

[19]

[11] Patent Number: 6,141,959
[45] Date of Patent: Nov. 7, 2000

[54] MULTI-CYLINDER AIR-COMPRESSING INJECTION-TYPE INTERNAL-COMBUSTION ENGINE

[75] Inventors: Steffen Digeser, Fellbach; Frank Duvinage, Kirchheim; Walter Friess, Stuttgart; Alexander Funk, Weinstadt-Endersbach; Anton Kerckhoff, Stuttgart; Bernd Krutzsch, Denkendorf; Detlef Scharr, Waiblingen; Michel Weibl; Guenter Wenninger, both of Stuttgart, all of Germany

[73] Assignee: DaimlerChrysler AG, Stuttgart, Germany

[21] Appl. No.: 09/116,439

[22] Filed: Jul. 16, 1998

[30] Foreign Application Priority Data

Jul. 16, 1997 [DE] Germany ............... 197 30 403

[51] Int. Cl.⁷ ............... F01N 3/18; F02M 25/07
[52] U.S. Cl. ............... 60/274; 60/278; 60/297
[58] Field of Search ............... 60/274, 278, 286, 60/297, 301, 311

[56] References Cited

U.S. PATENT DOCUMENTS

| | | | |
|---|---|---|---|
| 4,142,492 | 3/1979 | Kobayashi et al. | 60/278 |
| 4,151,715 | 5/1979 | Tachibana et al. | 60/278 |
| 4,179,892 | 12/1979 | Heydrich | 60/605 |
| 4,467,602 | 8/1984 | Iizuka et al. | 60/278 X |
| 5,894,726 | 4/1999 | Monnier | 60/278 X |

FOREIGN PATENT DOCUMENTS

| | | |
|---|---|---|
| 0 598 916 | 6/1994 | European Pat. Off. . |
| 0 621 400 | 10/1994 | European Pat. Off. . |
| 889 220 | 1/1999 | European Pat. Off. . |
| 196 09 306 | 9/1996 | Germany . |
| 196 20 780 | 12/1996 | Germany . |
| 6-212961 | 8/1994 | Japan . |

OTHER PUBLICATIONS

Patent Abstracts of Japan, vol. 18, No. 579, Nov. 7, 1994.

*Primary Examiner*—Tony M. Argenbright
*Attorney, Agent, or Firm*—Evenson, McKeown, Edwards & Lenahan, P.L.L.C.

[57] ABSTRACT

A multi-cylinder air-compressing injection-type internal-combustion engine having a nitric oxide adsorber catalyst and an exhaust gas return device. In order to increase the hydrocarbon fraction in the exhaust gas in front of an exhaust gas aftertreatment device during a regeneration phase and to reduce the oxygen content, exhaust gas pipes of the cylinders are divided into at least two flows, which extend separately from one another at least along a distance. An increased hydrocarbon emission is generated exclusively in the cylinders of one of the flows at times. Another of the flows is connected by way of the exhaust gas return device with an air intake pipe of the internal-combustion engine.

20 Claims, 1 Drawing Sheet

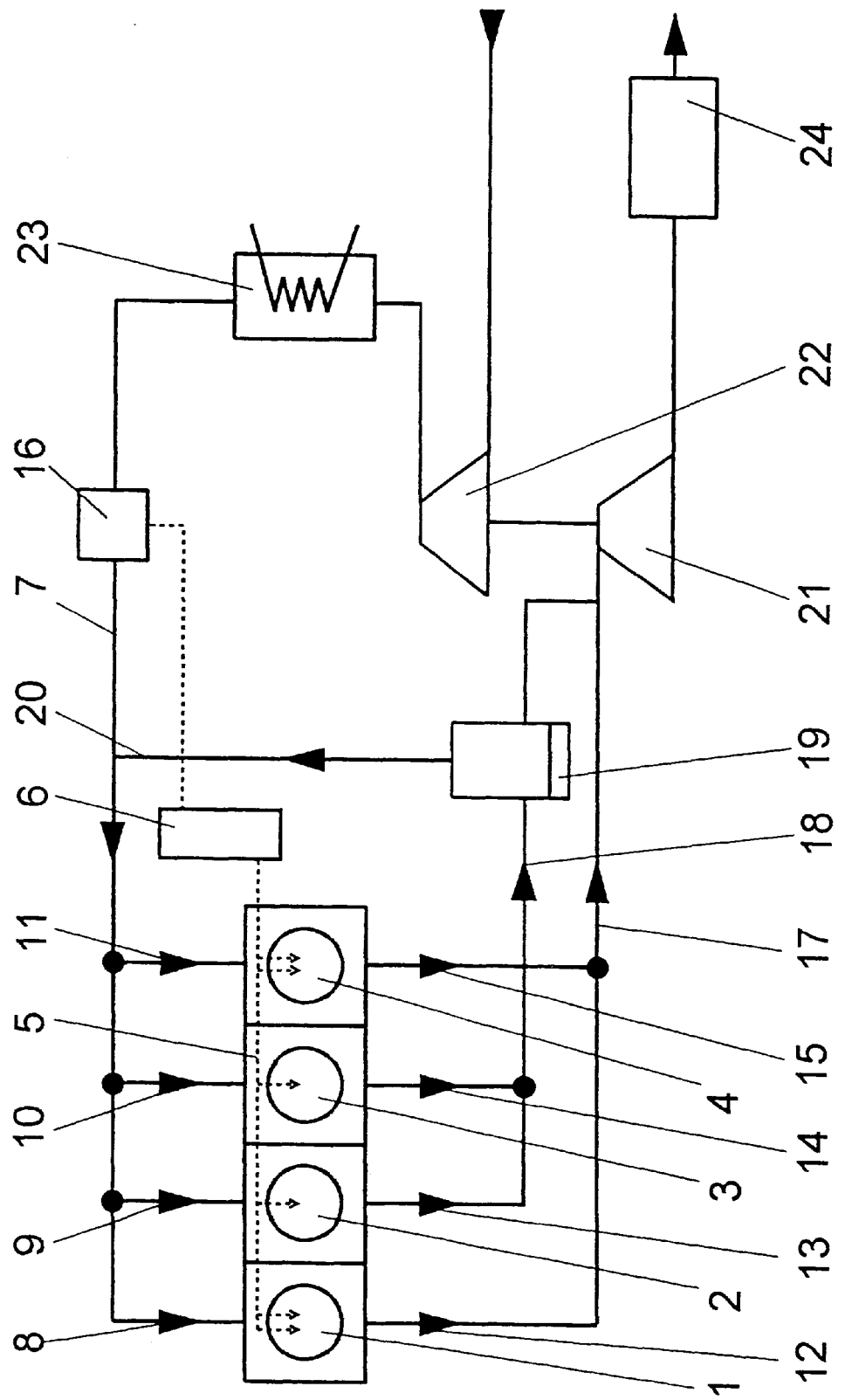

MULTI-CYLINDER AIR-COMPRESSING INJECTION-TYPE INTERNAL-COMBUSTION ENGINE

BACKGROUND AND SUMMARY OF THE INVENTION

This application claims the priority of German patent number 197 30 403.6-13, filed Jun. 16, 1997, the disclosure of which is expressly incorporated by reference herein.

The invention relates to a multi-cylinder air-compressing injection-type internal-combustion engine.

As a rule, air-compressing injection-type internal-combustion engines are operated with a high excess of air; that is, there is a lean mixture quality, in the case of which the lambda ratio of the actual air quantity to the air quantity required for the combustion of the respect fuel quantity is larger than 1. In the case of a fuel combustion with a high air excess and at high temperatures, a high nitric oxide fraction is generated in the exhaust gas.

It is known from European Patent Document EP 0 58 016 A1, among others, to reduce the nitric oxide in that it is first stored in an absorber catalyst and is desorbed and reduced in cyclically following generation phases. In the regeneration phases, which as a rule are clearly shorter than the adsorption phases, an exhaust gas is required in front of the nitric oxide absorber catalyst which ensures the reducing conditions on the active surfaces of the exhaust gas after treatment device. As a rule, exhaust gas is used for this purpose which is free of oxygen and enriched with hydrocarbon.

In order to obtain, in the case of an air-compressing injection-type internal-combustion engine, with a defined operation point which is held constant, an exhaust gas which is free of oxygen, the combustion must already be designed for a minimal air-fuel ratio. As a rule, this is achieved by means of an intentional deterioration of the specific fuel consumption in that the injected fuel flow rate is raised and simultaneously the air flow rate of the cylinder charge is lowered. It is known from European Patent Document EP 0 621 400 A1 to raise the fuel flow in that, at a late point in time, more fuel is injected and thus a late position of the combustion is achieved. The air flow of the cylinder charge can be reduced in that the combustion air and/or the exhaust gas flow is throttled and/or a portion of the exhaust gas is returned into the intake pipe. In the case of a portion of the cylinder filling, the exhaust gas return device replaces the fresh air with a 21% oxygen fraction by exhaust gas with a lower oxygen content. For this purpose, the exhaust gas return rate, that is, the ratio of returned exhaust gas to the overall charge in the cylinder or the ratio between the fresh air and the residual gas in the cylinder should be as high as possible. According to the operating point, exhaust gas return rates of above 40% are achieved in practice.

In order to intensify the reducing effect of the exhaust gas, it is expedient to raise the content of reducing agents, for example, of hydrocarbons which are obtained from the diesel fuel. Generally, this can be achieved in that more fuel is injected into the cylinders than can be burnt by the air charge. It is also known from the above-mentioned European Patent Document EP 0 621 400 in the case of air-compressing injection-type internal-combustion engines to inject in a delayed manner a portion of the fuel after the main injection for this purpose. The late injection significantly increases the fraction of unburnt hydrocarbons in the exhaust gas.

When exhaust gas enriched with hydrocarbon is admixed to the intake air by the exhaust gas return device, however, after the start of the ignition of the main injection, the ignition delay is always shortened and, mainly for this reason, the point of concentration of the combustion is displaced in the earlier direction. As a result, the desired effect of a late combustion position is partially canceled again.

A goal of the invention is to increase, in the case of an air-compressing injection-type internal-combustion engine with an exhaust gas return device, the hydrocarbon fraction in the exhaust gas by means of a reinjection and of reducing the oxygen fraction.

This and other goals have been achieved according to the present invention by providing an air-compressing injection-type internal-combustion engine, comprising: an air intake pipe; a plurality of cylinders communicating with said air intake pipe, each of said cylinders communicating with respective exhaust gas pipes, said exhaust gas pipes being divided into at least two exhaust gas flows which extend separately from one another at least along a distance; an increased hydrocarbon emission being selectively generated is exclusively in the cylinders corresponding to a first of said flows; a second of said flows being communicable with said air intake pipe via an exhaust gas return device; and a nitric oxide adsorber catalyst.

These and other goals have also been achieved according to the present invention by providing a system for controlling the exhaust gas of an air-compressing injection-type internal-combustion engine, comprising: an air intake pipe; a plurality of cylinders communicating with said air intake pipe; at least two separate exhaust gas conduits communicating with said cylinders, a first one of the exhaust gas conduits communicating with at least a first one of the cylinders, a second one of the exhaust gas conduits communicating with at least a second one of the cylinders, said at least a first one of the cylinders being mutually exclusive from said at least a second one of the cylinders; a control device which selectively generates an increased hydrocarbon emission exclusively in said at least a first one of the cylinders; an exhaust gas return device arranged in said second one of the exhaust gas conduits and controllable to selectively divert at least a portion of an exhaust gas flow through said second one of the exhaust gas conduits to said air intake pipe.

These and other goals have also been achieved according to the present invention by providing a method for controlling the exhaust gas of an air-compressing injection-type internal-combustion engine having an air intake pipe and a plurality of cylinders communicating with said air intake pipe, said method comprising: communicating at least two separate exhaust gas conduits with said cylinders, a first one of the exhaust gas conduits communicating with at least a first one of the cylinders, a second one of the exhaust gas conduits communicating with at least a second one of the cylinders, said at least a first one of the cylinders being mutually exclusive from said at least a second one of the cylinders; selectively generating an increased hydrocarbon emission exclusively in said at least a first one of the cylinders; controlling an exhaust gas return device arranged in said second one of the exhaust gas conduits to selectively divert at least a portion of an exhaust gas flow through said second one of the exhaust gas conduits to said air intake pipe.

According to the invention, the exhaust gases of some cylinders are used exclusively for the exhaust gas return device, while, in the remaining cylinders, an increased hydrocarbon emission is generated at times. The exhaust gases are correspondingly distributed separately from one another to exhaust gas pipe with at least two flows. The separation of the two exhaust gas flows must be maintained at least to the exhaust gas return device so that no exhaust gas enriched with hydrocarbon arrives in the intake pipe of the internal-combustion engine. As a result, it is ensured that the effect of an overapportioned or delayed fuel injection is not canceled by a premature ignition.

Expediently, the hydrocarbon emission is achieved by an incomplete combustion in the corresponding cylinders in that, controlled by an electronic system of the engine, a fuel excess and/or a portion of the fuel is injected in a delayed manner.

In the case of internal-combustion engines with an exhaust gas turbocharger, it is expedient to guide the flows of the exhaust gas pipes separately to the turbine housing which expediently has a two-flow construction. Only in the confluence space of the exhaust gas turbine, the exhaust gas flow enriched with the hydrocarbon is guided together with the exhaust gas flow of the other flow which was not used for the exhaust gas return device.

In order to be able to optimally utilize the effect of a shock-type charging, it is expedient for cylinders with a maximal spark gap to be combined to one flow.

If the number of cylinders is uniformly distributed to two flows, the exhaust gas return rate is limited to maximally 50% depending on the available pressure gradient. A higher exhaust gas return rate or a larger exhaust gas quantity enriched with hydrocarbon can be achieved by a non-uniform distribution of the cylinders to the flows.

In order to be able to adapt the ratio between the exhaust gas return rate and the exhaust gas quantity enriched with hydrocarbon to the operating conditions, it is expedient to provide more than two flows, of which at least one is alternately assigned exclusively to cylinders for the exhaust gas return without enrichment with the hydrocarbon or exclusively to cylinders with a temporary enrichment with hydrocarbon. By means of a multi-flow construction, the shock-type charging effect is also improved.

Other objects, advantages and novel features of the present invention will become apparent from the following detailed description of the invention when considered in conjunction with the accompanying drawings.

BRIEF DESCRIPTION OF THE DRAWINGS

The drawing is a schematic view of a multi-cylinder air-compressing injection-type internal-combustion engine according to a preferred embodiment of the invention.

DETAILED DESCRIPTION OF THE DRAWINGS

The illustrated air-compressing injection-type internal-combustion engine has first to fourth cylinders 1–4 to which fuel is supplied by way of a fuel injection arrangement 5 by means of an electronic control device 6 corresponding to the operating conditions and operating parameters. A compressor 22 of an exhaust gas turbocharger, whose exhaust gas turbine has the reference number 21, delivers combustion air into the cylinders 1–4 by way of a charge air cooler 23 and an intake pipe 7, from which branch off the intake connection pieces 8–11. The quantity of the taken-in air can be varied by a throttle device 16 by means of the control device 6 corresponding to defined parameters and corresponding characteristic diagrams.

Exhaust gas pipes 12–15 lead away from the cylinders 1–4, the exhaust gas pipes 12 and 15 being combined to form a first flow 17 and the exhaust gas pipes 13 and 14 being combined to form a second flow 18. The first flow 17 and the second flow 18 are guided separately to the exhaust gas turbine 21 which has a two-flow turbine housing. As a result, the exhaust gas turbine 21 can be operated in the partial-load range of the internal-combustion engine with a better efficiency in the shock-type operation. For this purpose, it is advantageous for the cylinders with maximal spark gaps to be combined to one flow 17, 18 respectively. In the case of a customary ignition sequence for four cylinders 1–4 arranged in a row, this is the first cylinder and the fourth cylinder, as well as the second cylinder 2 and the third cylinder 3, as in the illustrated preferred embodiment.

In the second flow 18, an exhaust gas return device 19 is provided in front of (i.e., upstream from) the exhaust gas turbine 21. A portion of the exhaust gas of the second flow 18 is guidable via the exhaust gas return device 19 through the exhaust gas return pipe 20 into the intake pipe 7. The exhaust gas return device 19 and the throttle device 16 have the purpose of changing the quality of the fuel mixture in the cylinders 1–4. By means of a fuel excess—a rich mixture with lambda lower than 1—the oxygen in the exhaust gas can be reduced and the hydrocarbon fraction in the exhaust gas can simultaneously be increased. This effect is also intensified in that a portion of the fuel is injected in a delayed manner after the main injection into the cylinders 1–4.

The exhaust gas of the internal-combustion engine is finally fed to a nitric oxide (nitrogen oxides) absorber catalyst 24. In this catalyst, the nitric oxide is stored during the normal operating phase of the internal-combustion engine. The nitric oxide is formed in particular in the case of a high air excess and at high temperatures. The nitric oxide absorber catalyst 24 is regenerated at cyclical intervals, in that the nitric oxide is desorbed and is reduced by means of an exhaust gas with a reducing effect.

According to the invention, a reducing exhaust gas with an increased hydrocarbon fraction is generated during the regeneration phases in the cylinders 1 and 4, in that, by means of the control unit 6, increasingly fuel and/or a portion of the fuel is injected in a delayed manner. So that an increased hydrocarbon fraction in the exhaust gas will not have the result that, because of the exhaust gas return into the intake pipe 7, the desired delayed ignition of the fuel is partially canceled again, the cylinders 2 and 3 are operated by means of a normal fuel injection and their exhaust gas is used exclusively by way of the second flow 18 for the exhaust gas return. The exhaust gas of these two cylinders 2 and 3 not required for the exhaust gas return is then admixed in the exhaust gas turbine 21 to the remaining exhaust gas of the first flow 17.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air-compressing injection-type internal-combustion engine, comprising:

an air intake pipe;

a plurality of cylinders communicating with said air intake pipe, each of said cylinders communicating with respective exhaust gas pipes, said exhaust gas pipes being divided into at least two exhaust gas flows which extend separately from one another at least along a distance;

an increased hydrocarbon emission being selectively generated exclusively in the cylinders corresponding to a first of said flows; and a second of said flows being communicable with said air intake pipe via an exhaust gas return device;

each exhaust gas flow being fed to a nitric oxide adsorber catalyst.

2. An internal-combustion engine according to claim 1, wherein the increased hydrocarbon emission is generated by at least one of a rich fuel mixture and a delayed partial injection to said cylinders corresponding to a first of said flows.

3. An internal-combustion engine according to claim 1, further comprising an exhaust gas turbine with a two-flow turbine housing, said separate first and second flows being guided together in an inflow space of the exhaust gas turbine.

4. An internal-combustion engine according to claim 3, wherein said first flow corresponds to respective ones of said cylinders which have a maximal spark gap.

5. An internal-combustion engine according to claim 1, wherein a non-uniform number of cylinders are assigned to said at least two exhaust gas flows.

6. An internal-combustion engine according to claim 1, wherein at least three of said exhaust gas flows are provided, of which at least one is alternately assigned exclusively to respective ones of said cylinders for the exhaust gas return without an increased hydrocarbon content or exclusively to respective ones of said cylinders with a temporarily increased hydrocarbon emission.

7. A system for controlling the exhaust gas of an air-compressing injection-type internal-combustion engine, comprising:

an air intake pipe;

a plurality of cylinders communicating with said air intake pipe;

at least two separate exhaust gas conduits communicating with said cylinders, a first one of the exhaust gas conduits communicating with at least a first one of the cylinders, a second one of the exhaust gas conduits communicating with at least a second one of the cylinders, said at least a first one of the cylinders being mutually exclusive from said at least a second one of the cylinders;

a control device which selectively generates an increased hydrocarbon emission exclusively in said at least a first one of the cylinders;

an exhaust gas return device arranged in said second one of the exhaust gas conduits and controllable to selectively divert at least a portion of an exhaust gas flow through said second one of the exhaust gas conduits to said air intake pipe.

8. A system according to claim 7, further comprising a nitric oxide adsorber catalyst arranged to receive an exhaust gas flow from said first one of the exhaust gas conduits and a remaining portion of the exhaust gas flow through said second one of the exhaust gas conduits which is not diverted to the air intake pipe.

9. A system according to claim 7, wherein said control device selectively generates an increased hydrocarbon emission by controlling fuel injection system to said at least a first one of the cylinders to obtain at least one of a rich fuel mixture and a delayed partial injection.

10. A system according to claim 8, further comprising an exhaust gas turbine arranged upstream of said nitric oxide adsorber catalyst, said exhaust gas turbine receiving said exhaust gas flow from said first one of the exhaust gas conduits and said remaining portion of the exhaust gas flow through said second one of the exhaust gas conduits which is not diverted to the air intake pipe.

11. A system according to claim 7, wherein said at least a first one of the cylinders have a maximal spark gap.

12. A system according to claim 7, wherein the number of said cylinders in said at least a first one of the cylinders is different from the number of cylinders in said at least a second one of the cylinders.

13. A system according to claim 7, wherein at least three of said exhaust gas conduits are provided, of which at least one is alternately assigned exclusively to respective ones of said cylinders for the exhaust gas return without an increased hydrocarbon content or exclusively to respective ones of said cylinders with a temporarily increased hydrocarbon emission.

14. A method for controlling the exhaust gas of an air-compressing injection-type internal-combustion engine having an air intake pipe and a plurality of cylinders communicating with said air intake pipe, said method comprising:

communicating at least two separate exhaust gas conduits with said cylinders, a first one of the exhaust gas conduits communicating with at least a first one of the cylinders, a second one of the exhaust gas conduits communicating with at least a second one of the cylinders, said at least a first one of the cylinders being mutually exclusive from said at least a second one of the cylinders;

selectively generating an increased hydrocarbon emission exclusively in said at least a first one of the cylinders;

controlling an exhaust gas return device arranged in said second one of the exhaust gas conduits to selectively divert at least a portion of an exhaust gas flow through said second one of the exhaust gas conduits to said air intake pipe.

15. A method according to claim 14, further comprising arranging a nitric oxide adsorber catalyst to receive an exhaust gas flow from said first one of the exhaust gas conduits and a remaining portion of the exhaust gas flow through said second one of the exhaust gas conduits which is not diverted to the air intake pipe.

16. A method according to claim 14, wherein said selectively generating step comprises controlling a fuel injection system to said at least a first one of the cylinders to obtain at least one of a rich fuel mixture and a delayed partial injection.

17. A method according to claim 15, further comprising arranging an exhaust gas turbine upstream of said nitric oxide adsorber catalyst, said exhaust gas turbine receiving said exhaust gas flow from said first one of the exhaust gas conduits and said remaining portion of the exhaust gas flow through said second one of the exhaust gas conduits which is not diverted to the air intake pipe.

18. A method according to claim 14, wherein said at least a first one of the cylinders have a maximal spark gap.

19. A method according to claim 14, wherein the number of said cylinders in said at least a first one of the cylinders is different from the number of cylinders in said at least a second one of the cylinders.

20. A method according to claim 14, wherein at least three of said exhaust gas conduits are provided, of which at least one is alternately assigned exclusively to respective ones of said cylinders for the exhaust gas return without an increased hydrocarbon content or exclusively to respective ones of said cylinders with a temporarily increased hydrocarbon emission.

* * * * *